(12) United States Patent
Ip et al.

(10) Patent No.: US 11,193,801 B2
(45) Date of Patent: Dec. 7, 2021

(54) AMPLIFIER DYNAMICS COMPENSATION FOR BRILLOUIN OPTICAL TIME-DOMAIN REFLECTOMETRY

(71) Applicant: NEC Laboratories America, Inc., Princeton, NJ (US)

(72) Inventors: Ezra Ip, West Windsor, NJ (US); Yue-Kai Huang, Princeton, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 16/879,670

(22) Filed: May 20, 2020

(65) Prior Publication Data

US 2020/0370928 A1    Nov. 26, 2020

Related U.S. Application Data

(60) Provisional application No. 62/851,165, filed on May 22, 2019.

(51) Int. Cl.
*G01D 5/353*       (2006.01)
*G01L 1/24*        (2006.01)
(Continued)

(52) U.S. Cl.
CPC ......... *G01D 5/35364* (2013.01); *G01K 11/32* (2013.01); *G01K 11/322* (2021.01);
(Continued)

(58) Field of Classification Search
CPC .......... G01L 1/24; G01L 1/242; G01L 1/243; G01L 1/245; G01L 1/246; G01L 1/247; G01L 1/248; G01L 1/25; G01L 1/255; G01L 1/241; G01K 11/32; G01K 11/3206; G01K 11/322; G01K 2011/322; G01D 5/35354; G01D 5/35358; G01D 5/35364; G01D 5/35377; G01M 11/08; G01M 11/083; G01M 11/085; G01M 11/088; G01M 11/30; G01M 11/31; G01M 11/309; G01M 11/3118; G01M 11/3127; G01M 11/3136; G01M 11/3145; G01M 11/3154;
(Continued)

(56) References Cited

U.S. PATENT DOCUMENTS 3,356,438 A * 12/1967 Macek ................. G02F 1/0344
                                                  359/247
6,547,453 B1 * 4/2003 Stummer ............. H04B 10/071
                                                  385/24
(Continued)

FOREIGN PATENT DOCUMENTS

| CN | 101839698 A | * | 9/2010 |
| EP | 0910863 B1 |   | 9/2003 |
| WO | 2018005539 A1 |   | 1/2018 |

OTHER PUBLICATIONS

Machine translation of description of CN 101839698 A, 6 pages. (Year: 2010).*

(Continued)

*Primary Examiner* — Gordon J Stock, Jr.
(74) *Attorney, Agent, or Firm* — Joseph Kolodka

(57) ABSTRACT

Aspects of the present disclosure describe amplifier dynamics compensation through feedback control for distributed fiber sensing systems, methods, and structures employing Brillouin optical time-domain reflectometry.

4 Claims, 16 Drawing Sheets

(51) Int. Cl.
  *G01K 11/32* (2021.01)
  *G01M 11/00* (2006.01)
  *G01K 11/322* (2021.01)

(52) U.S. Cl.
  CPC ............ *G01L 1/242* (2013.01); *G01M 11/319* (2013.01); *G01M 11/3109* (2013.01)

(58) Field of Classification Search
  CPC ......... G01M 11/3163; G01M 11/3172; G01M 11/3181; G01M 11/319
  USPC ...................... 356/32–35.5, 73.1; 385/12, 13
  See application file for complete search history.

(56) References Cited

U.S. PATENT DOCUMENTS

| | | | | |
|---|---|---|---|---|
| 7,283,216 | B1* | 10/2007 | Geng | G01B 11/18 356/35.5 |
| 7,499,151 | B2* | 3/2009 | Bao | G01K 11/32 356/35.5 |
| 9,410,826 | B2* | 8/2016 | Bastianini | G01D 5/35364 |
| 10,107,651 | B2* | 10/2018 | Yaman | G01M 11/3118 |
| 2004/0257578 | A1* | 12/2004 | Kane | G01J 11/00 356/450 |
| 2005/0105167 | A1* | 5/2005 | Martinelli | G01M 11/319 359/334 |
| 2009/0263069 | A1* | 10/2009 | Hartog | G01D 5/35364 385/12 |
| 2013/0229649 | A1* | 9/2013 | Li | G01D 5/35364 356/73.1 |
| 2014/0152982 | A1* | 6/2014 | Gosteli | G01M 11/085 356/300 |
| 2015/0003834 | A1* | 1/2015 | Shan | G01D 5/35364 398/116 |
| 2016/0109222 | A1* | 4/2016 | Wang | G01B 11/168 356/34 |
| 2016/0109223 | A1* | 4/2016 | Wang | G01B 11/168 356/33 |
| 2016/0131600 | A1* | 5/2016 | Pate | G01J 3/453 250/339.08 |
| 2017/0052041 | A1* | 2/2017 | Cedilnik | G01L 1/242 |
| 2017/0254708 | A1* | 9/2017 | Koizumi | G01K 11/32 |
| 2017/0350734 | A1* | 12/2017 | Ji | G01D 5/35306 |
| 2018/0045542 | A1* | 2/2018 | Ramirez-Mancilla | G01D 5/35364 |
| 2019/0204192 | A1* | 7/2019 | Jaaskelainen | G01N 29/04 |
| 2020/0149878 | A1* | 5/2020 | Zadok | G01B 11/16 |
| 2020/0370949 | A1* | 11/2020 | Ip | G01H 9/004 |

OTHER PUBLICATIONS

Ip, Ezra et al., "Coherent detection in optical fiber systems," 2008, Optics Express, vol. 16, No. 2, pp. 753-791. (Year: 2008).*

* cited by examiner

AMPLIFIER DYNAMICS COMPENSATION FOR BRILLOUIN OPTICAL TIME-DOMAIN REFLECTOMETRY

CROSS REFERENCE

This disclosure claims the benefit of U.S. Provisional Patent Application Ser. No. 62/851,165 filed May 22, 2019 the entire contents of which is incorporated by reference as if set forth at length herein.

TECHNICAL FIELD

This disclosure relates generally to distributed fiber sensing systems, methods, and structures. More particularly, it describes amplifier dynamics compensation for Brillouin optical time-domain reflectometry (BOTDR).

BACKGROUND

In a distributed fiber sensor, system reach is limited by signal-to-noise ratio (SNR). Conventionally, the interrogator transmits an optical pulse down a fiber where a variable of its environment, such as temperature or strain, is measured. The receiver is typically located on the same side as the interrogator and measures a reflected signal arising from Rayleigh, Brillouin or Raman backscatter. Time-of-flight is used to infer the location of a temperature or strain 'event'. SNR is defined by the ratio between reflected energy, which is the product between the reflected power and the duration of the optical pulse; and total noise of the system, which includes amplified spontaneous emission (ASE) of inline amplifiers, shot noise arising from photodiodes, and thermal noise of electronic components at the receiver.

One method to increase SNR is to increase the power of the launched optical pulse. As in optical communications, however, Kerr nonlinearity limits the peak power that can be launched into a fiber. At very high power levels, the optical pulse breaks up due to the interaction between nonlinearity and dispersion, causing SNR to be degraded. Alternative, SNR can also be increased by using longer optical pulses. But this worsens the achievable spatial resolution $\Delta z = (c/2n_{\mathit{eff}})T$ and may not be desirable.

SUMMARY

An advance in the art is made according to aspects of the present disclosure directed to amplifier dynamics compensation for distributed fiber sensing systems, methods, and structures employing Brillouin optical time-domain reflectometry.

In sharp contrast to the prior art, systems, methods, and structures according to aspects of the present disclosure mitigate gain dynamics using feedback control.

BRIEF DESCRIPTION OF THE DRAWING

A more complete understanding of the present disclosure may be realized by reference to the accompanying drawing in which:

FIG. 2(A), $A_1(t)$ through, FIG. 2(B), EDFA and FIG. 2(C), Raman amplifier, showing the effects of gain dynamics according to aspects of the present disclosure;

FIG. 5(A) and FIG. 5(B) show a schematic diagram of: FIG. 5(A) coherent receiver, and FIG. 5(B) digital signal processing operations to obtain Brillouin frequency shift (BFS) at every fiber position according to aspects of the present disclosure.

Figure 1:
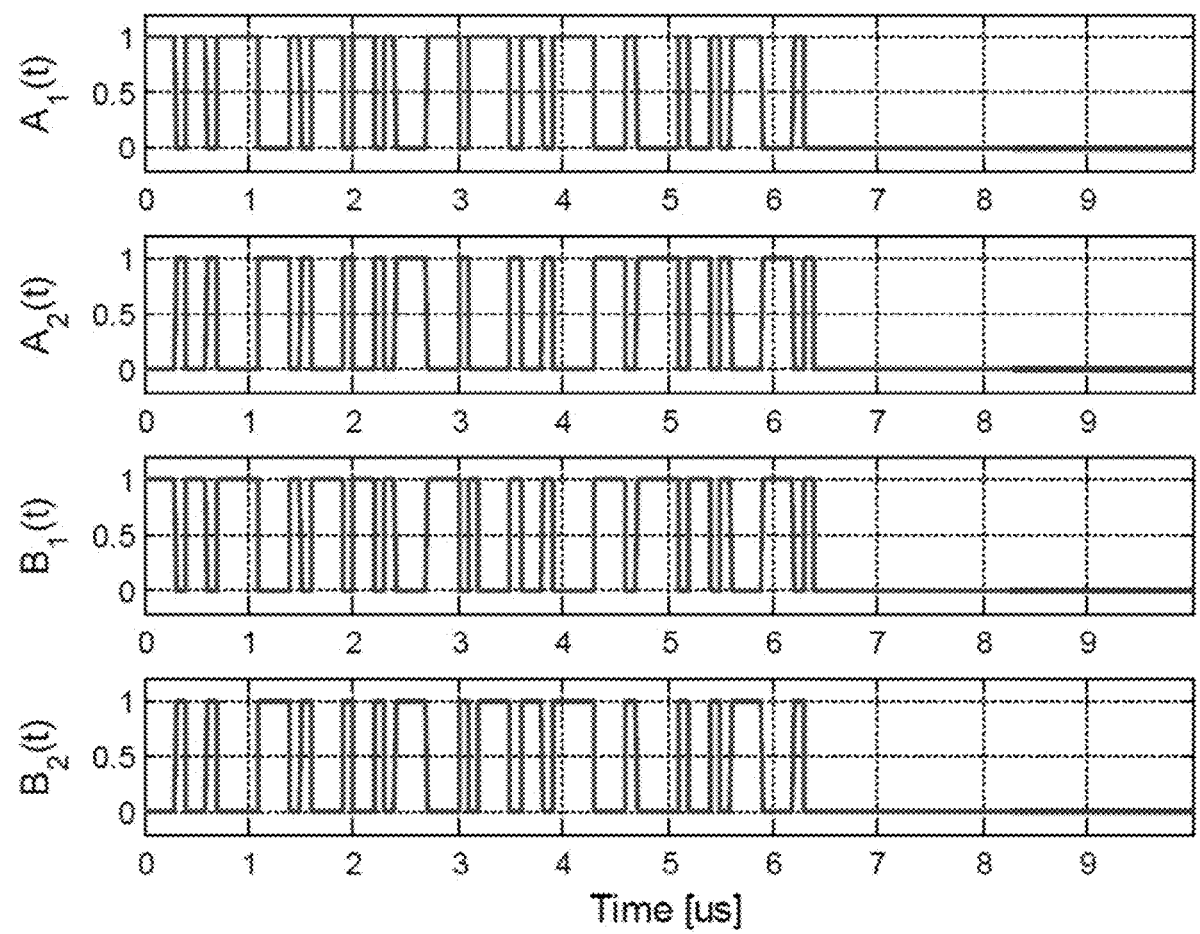
FIG. 1 shows an example of transmitted complementary Golay sequences (L=64) at a chip period of 10 µs according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

Coded BOTDR

By way of some additional background, we note that it is possible to simultaneously increase SNR and maintain spatial resolution by transmitting a coded sequence instead of a single optical pulse. One key to achieve this effect is to use a code with whose autocorrelation function is as close to a delta function as possible. In Brillouin optical time-domain reflectometry (BOTDR), the use of complementary Golay sequences has been proposed. (See, e.g., Y. Mao, N. Guo, K. L. Yu, H. Y. Tam, "1-cm spatial resolution Brillouin optical time-domain analysis based on bright pulse Brillouin gain and complementary code," IEEE Photon J., vol. 4, no. 6, pp. 2243-2248, December 2012.)

Let $A_1[n]$, $A_2[n]$, $B_1[n]$ and $B_2[n]$ be the four complementary Golay sequences. The interrogator transmits four continuous-time (c.t.) signals $A_1(t)=\Sigma_n A_1[n]$ rect $(t/T)$, etc., where T is the chip period which determines the spatial resolution achieved (see example in FIG. 1). The four c.t. signals are launched consecutively into the fiber under test (FUT) in different time frames. Let the received signals associated with these sequences be $y_{A1}(t)$, $y_{A2}(t)$, $y_{B1}(t)$ and $y_{B2}(t)$, respectively, where $y_{A1}(t)=A_1(t)\otimes h(t)+n_{A1}(t)$, etc., and $h(t)$ is the Brillouin intensity impulse response, $\otimes$ denotes convolution, and $n_{A1}(t)$ is noise. The Brillouin intensity impulse response can be estimated by:

$$\tilde{h}(t)=(y_{A1}(t)-y_{A2}(t))*A(t)+(y_{B1}(t)-y_{B2}(t))*B(t) \quad [1]$$

where * denotes correlation. To reduce the impact of noise, it is possible to transmit the four sequences $N_{rep}$ times followed by taking a time-average to obtain $\bar{y}_{A1}(t)$, before invoking Eq. (1) to estimate $\tilde{h}(t)$. It has been shown that using complementary Golay sequences of length L chips increases SNR by $\sqrt{L}/2$ compared with the launching single optical pulses. The square-root dependence is due to incoherent combining—i.e., autocorrelation is computed for reflected power.

Transmission of a coded sequence suffers from gain dynamics when the signal passes through inline optical amplifiers including Raman amplifiers and remote optically pumped amplifiers (ROPA) using erbium doped fibers (EDF). Gain dynamics is caused by the saturation of the Raman pump in the case of Raman amplification, or saturation of the upper level population of Erbium atoms in the case of EDFAs and ROPAs. The presence of a string of consecutive '1' bits in the forward-propagating signal will reduce the amplifier's gain. Conversely, a string of consecutive '0' bits will cause buildup of the Raman pump or the upper level Erbium atoms, resulting an increase in output power at the next '1' bit.

Figure 2A:
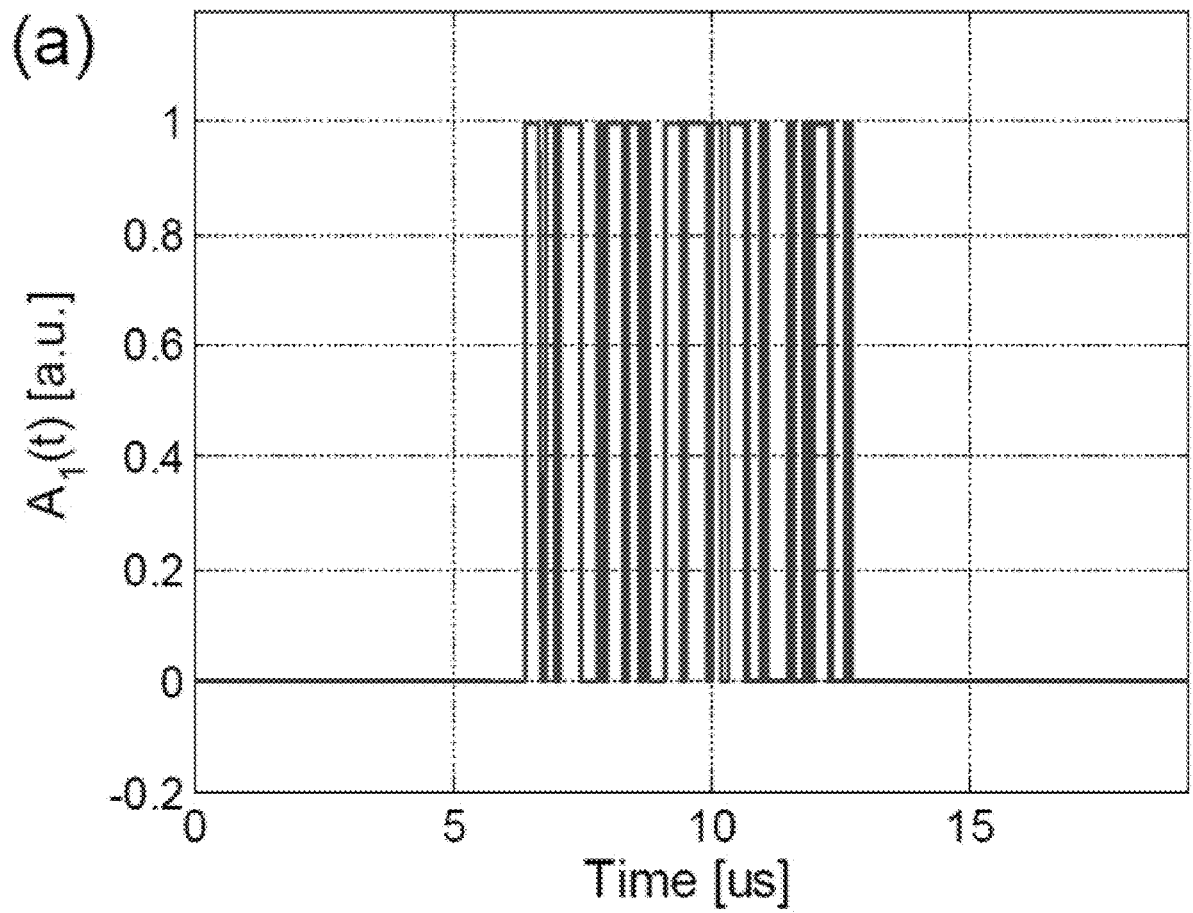
FIG. 2(A), FIG. 2(B), and FIG. 2(C) show an illustrative simulation of passing complementary Golay sequence.
Figure 2B:
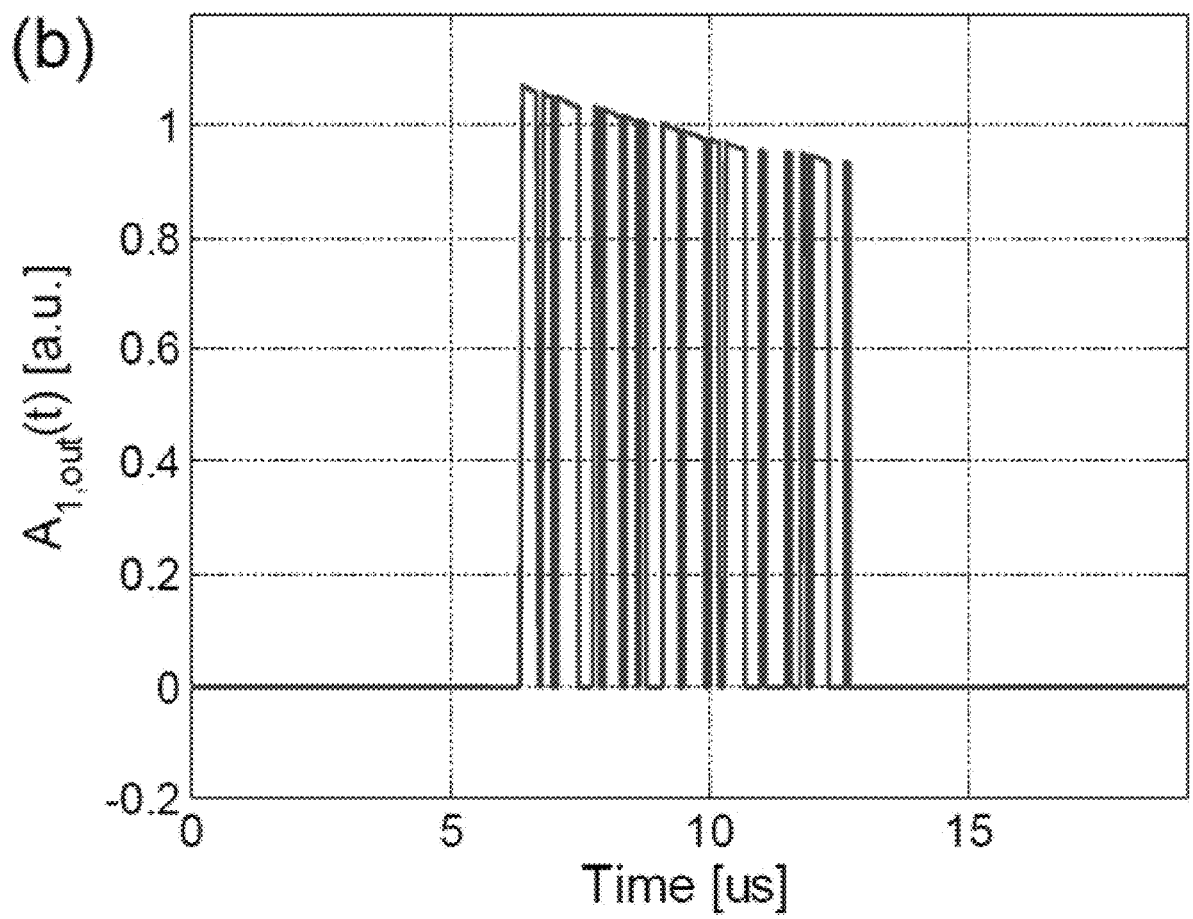
Figure 2C:
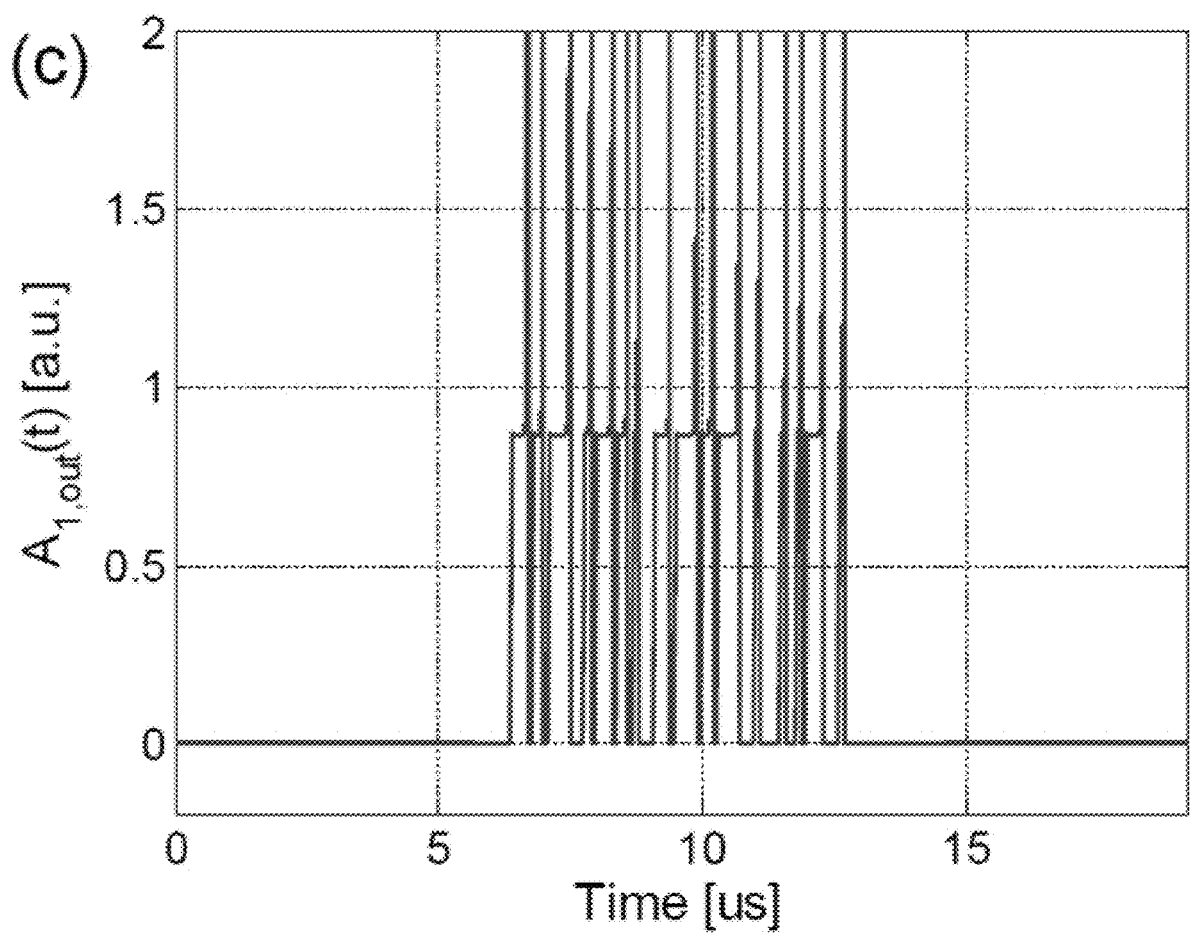

FIG. 2(A), FIG. 2(B), and FIG. 2(C) show an illustrative simulation of passing complementary Golay sequence: FIG. 2(A), $A_1(t)$ through, FIG. 2(B), EDFA and FIG. 2(C), Raman amplifier, showing the effects of gain dynamics according to aspects of the present disclosure.

The chip period of 100 ns corresponds to a spatial resolution 10 m. It is observed that gain dynamics of an EDFA is 'slow' compared with the chip period, so gain dependence manifests as a change in the amplitude envelope of the signal. In a Raman amplifier, gain dynamics arise from chromatic dispersion which causes the pump to walk off relative to the forward-propagating signal. The maximum rate of change in gain is much faster, manifesting as power spikes just before a '0' bit.

Amplifier Dynamics

Figure 3:
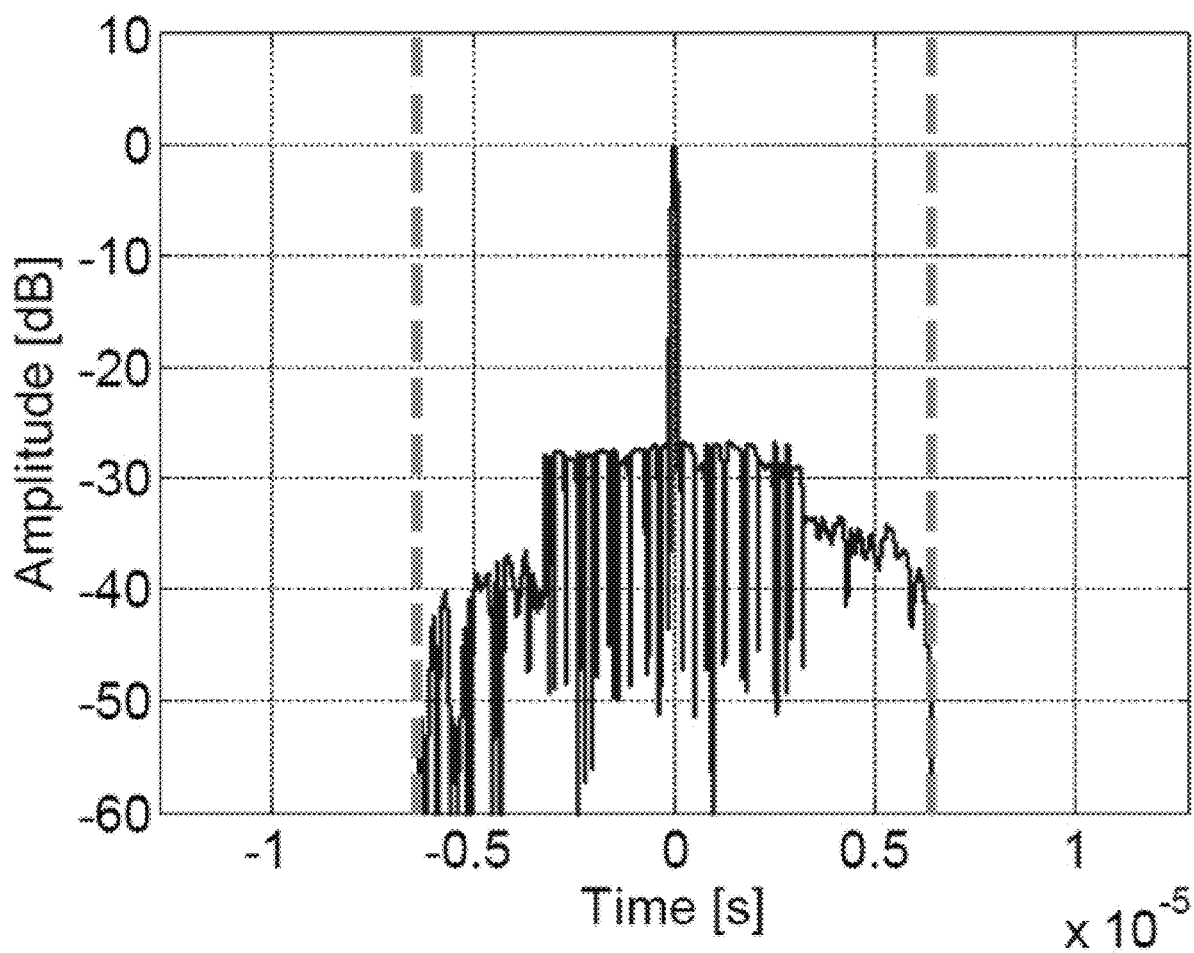
FIG. 3 is an example autocorrelation function obtained from passing complementary Golay codes through an EDFA followed by correlation and sum for $h(t)=\delta(t)$, the pedestal arises from gain dynamics according to aspects of the present disclosure.

The impact of amplifier gain dynamics on the autocorrelation function of complementary Golay sequences is shown in FIG. 3, where a pedestal is observed from $t=-(L-1)T$ to $+(L+1)T$. We can write the autocorrelation as $(A_1(t)-A_2(t))*A(t)+(B_1(t)-B_2(t))*B(t)=4L[\delta(t)+w(t)]$, where $w(t)$ is the pedestal. In the absence of noise, Brillouin intensity impulse response measured by the receiver will be $\tilde{h}(t)=h(t)\otimes 4L[\delta(t)+w(t)]$, where time of flight t is related to fiber position z via $z=(c/2n_{eff})t$, and $n_{eff}$ is the effective index of group velocity in the optical fiber. A pedestal in the autocorrelation function will cause 'spatial leakage', as the value of $\tilde{h}(z)=\tilde{h}((c/2n_{eff})t)$ will depend on neighboring positions $h(z-z')$, due to convolution with non-zero values of $w(z)$.

In BOTDR, spatial leakage means that the Brillouin gain spectrum (BGS) calculated for position z along the fiber will be superimposed with the BGS's at locations $z-z'$, where $z' \in \{-(c/2n_{eff})(L-1)T, +(c/2n_{eff})(L-1)T\}$.

Suppose a temperature or strain disturbance at z causes the center frequency of the BGS to shift relative to neighboring positions along the fiber. Spatial leakage may lead to incorrect determination of the Brillouin center frequency if there is insufficient signal-to-interference $SIR=1/\int_{-\infty}^{\infty}|w(t)|^2 dt$. Spatial leakage can be particularly severe when a temperature or strain 'event' occurs just before an amplifier, since amplification causes strong backscatter immediately after the amplifier, and the BGS's of those positions will superimpose heavily on the BGS of positions just before the amplifier where power is weak.

Feedback Control

Figure 4:
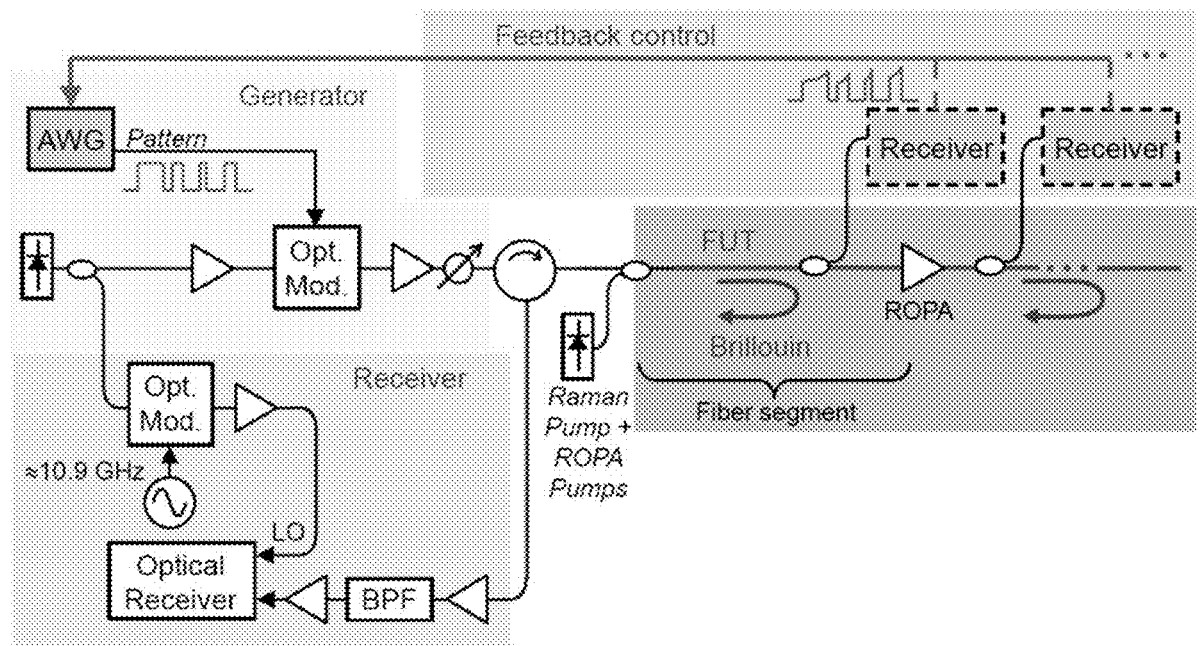
FIG. 4 is a schematic diagram of an illustrative architecture for BOTDR with feedback control in which compensation for signal amplitude fluctuations along a fiber segment between two amplifiers due to amplifier dynamics a splitter and receiver detects the amplitude, and provides feedback to generator's arbitrary waveform generator (AWG)—according to aspects of the present disclosure.

Advantageously, and according to aspects of the present disclosure, it is possible to mitigate gain dynamics using feedback control as shown in the architecture in FIG. 4.

FIG. 4 is a schematic diagram of an illustrative architecture for BOTDR with feedback control in which compensation for signal amplitude fluctuations along a fiber segment between two amplifiers due to amplifier dynamics a splitter and receiver detects the amplitude, and provides feedback to generator's arbitrary waveform generator (AWG)—according to aspects of the present disclosure.

Figure 5A:
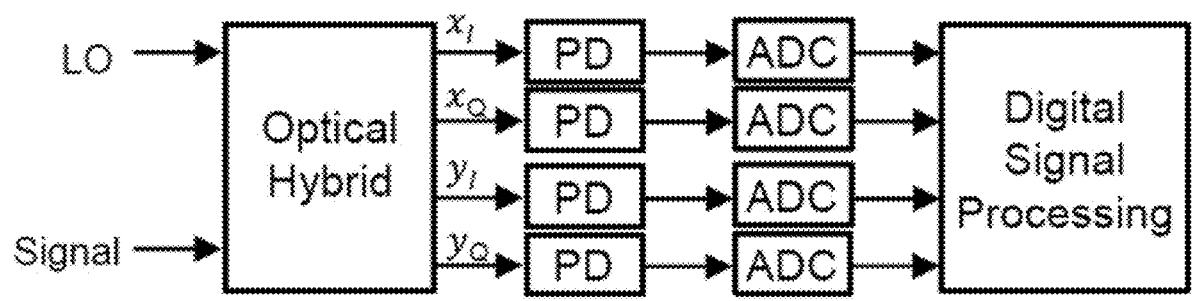
Figure 5B:
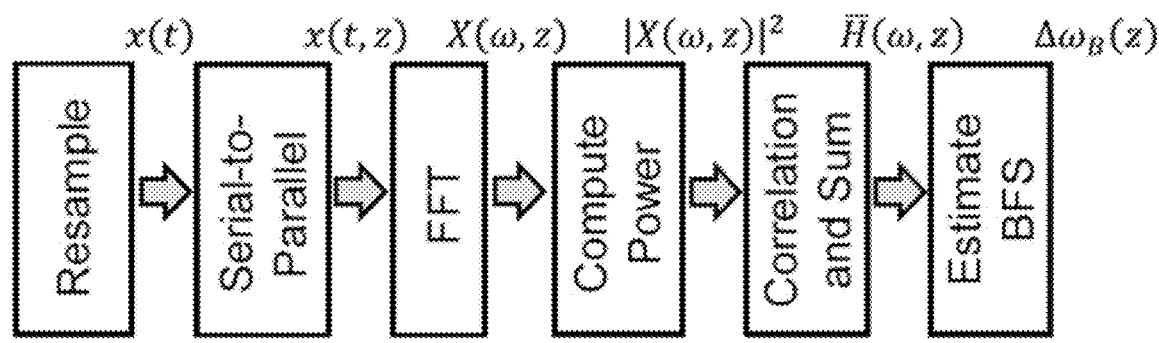

FIG. 5(A) and FIG. 5(B) show a schematic diagram of: FIG. 5(A) coherent receiver, and FIG. 5(B) digital signal processing operations to obtain Brillouin frequency shift (BFS) at every fiber position. The digitized signal is first resampled and retimed, followed by parallelization align the received data relative to the pattern repetition period. To obtain the Brillouin gain spectrum (BGS), $x(t, z)$ is passed through Fourier transform (FFT), followed by computation of square amplitude (power) at each frequency, followed by correlation-and-add with the launched complementary Golay sequence as per Eq. (1). The BFS is then estimated from the peak frequency of the BGS.

To measure the amplitude profile of the forward-propagating signal on a given segment of the fiber under test (FUT) between two optical amplifiers, we use a splitter followed by a photodetector. Let the power profile measured at the k-th iteration be $P_{meas}^{(k)}(t)$, and let the desired power profile be $P(t)$. Their ratio $P_\varepsilon^{(k)}(t)=P_{meas}(t)/P(t)$ can used to adjust the output of the arbitrary waveform generator (AWG) according to $$x_{out}^{(k+1)}(t) = \frac{1}{\sqrt{P_\varepsilon^{(k)}(t)}} x_{out}^{(k)}(t),$$

where $x_{out}^{(k)}(t)$ is the AWG output at the k-th iteration. Since amplifier gain dynamics is nonlinear, several iterations are required until convergence between $P_{meas}^{(k)}(t)$ and $P(t)$.

Figure 6A:
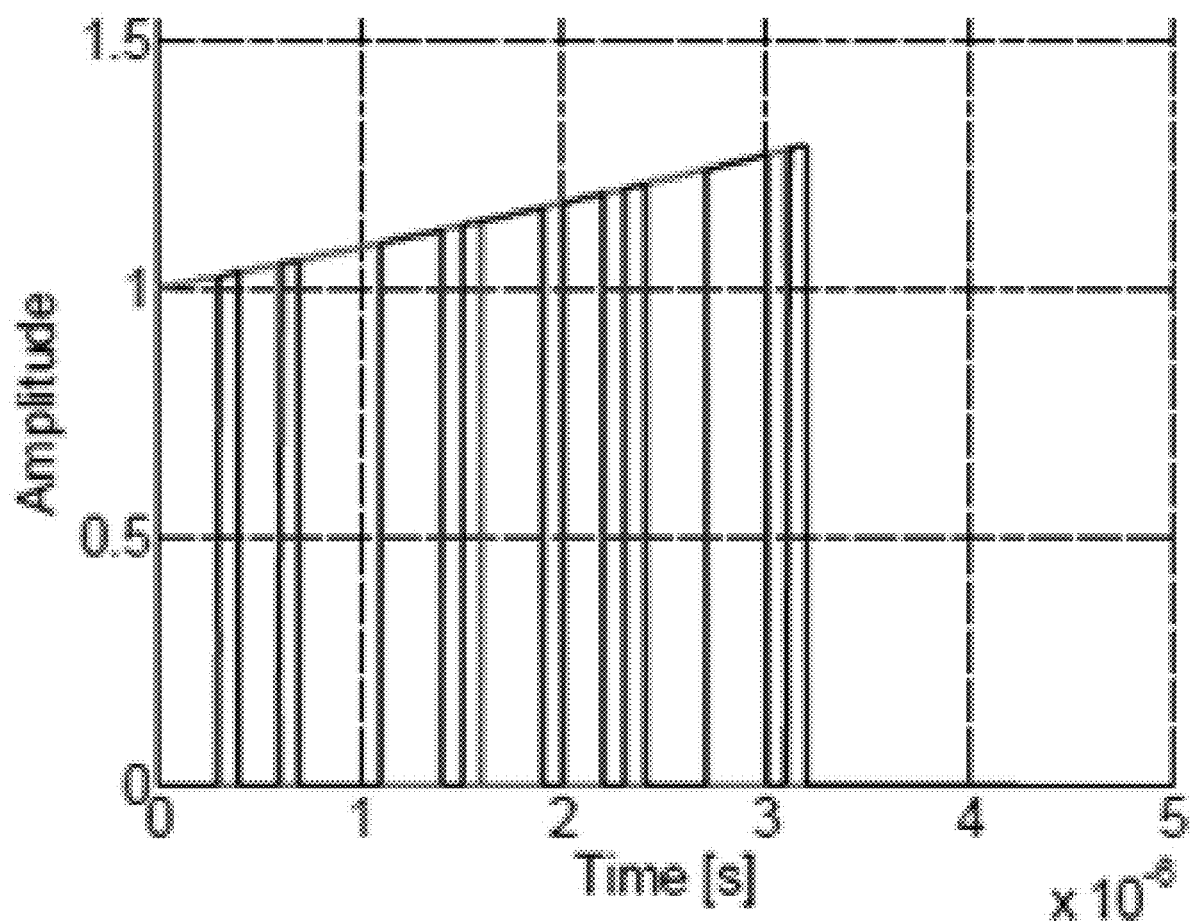
FIG. 6(A), FIG. 6(B), FIG. 6(C), FIG. 6(D), FIG. 6(E), FIG. 6(F), FIG. 6(G), FIG. 6(H), and FIG. 6(I), show a series of plots illustrating experimental results for gain dynamics mitigation using feedback and adaptive control wherein the signal is passed through a cascade of EDFA and Raman amplifiers in which for a first iteration FIG. 6(A), an initial tilt of 1 dB was implemented in the AWG, resulting in the amplitude profile measured at the receiver shown by FIG. 6(B), whose autocorrelation function is shown by FIG. 6(C), the SIR is 8.6 dB; second iteration FIG. 6(D) adjustment from the first iteration is applied to the AWG, resulting in new AWG waveforms, as well as output and autocorrelations shown by FIG. 6(E) and FIG. 6(F), SIR is 11.4 dB; fifth iteration FIG. 6(G), FIG. 6(H), and FIG. 6(I), the SIR of the autocorrelation increases to 16.5 dB, according to aspects of the present disclosure.
Figure 6B:
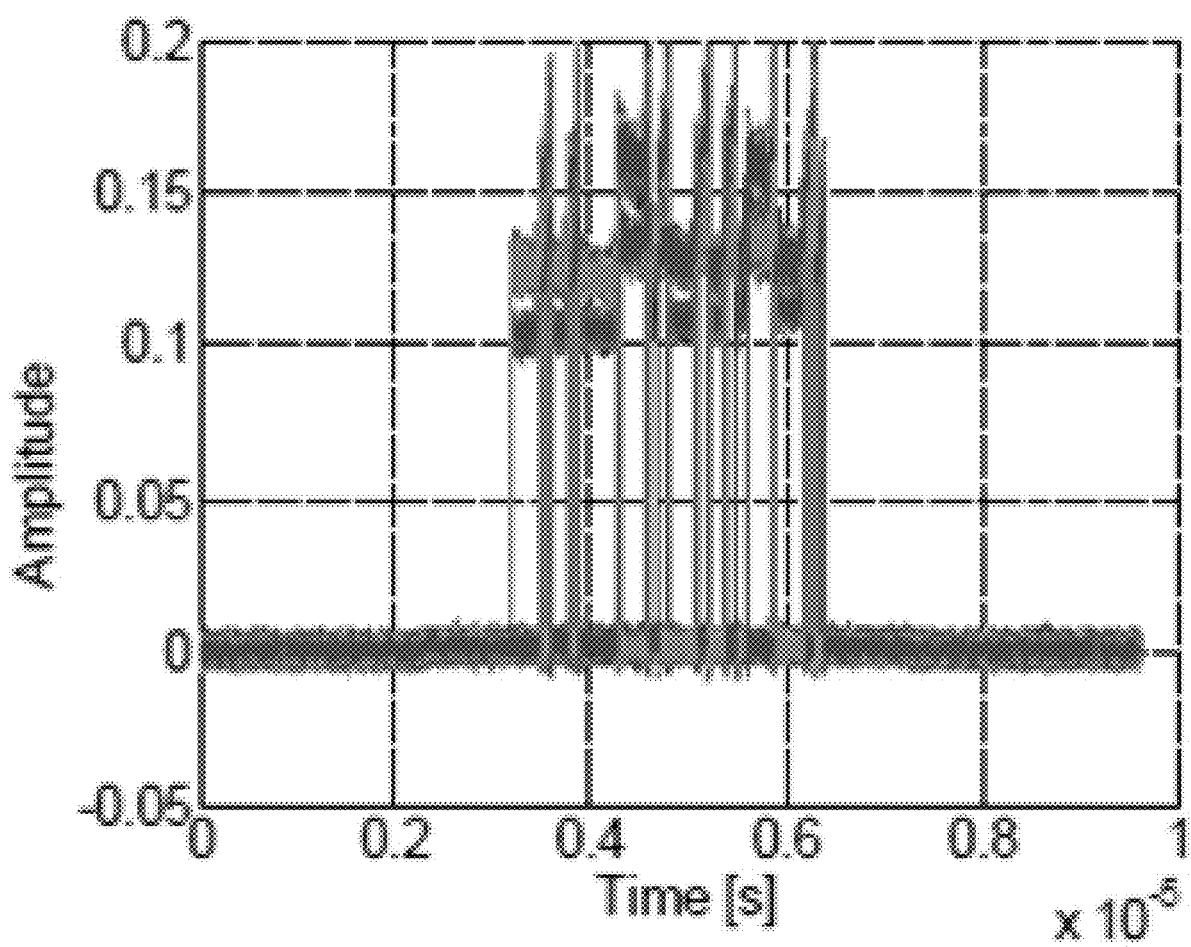
Figure 6C:
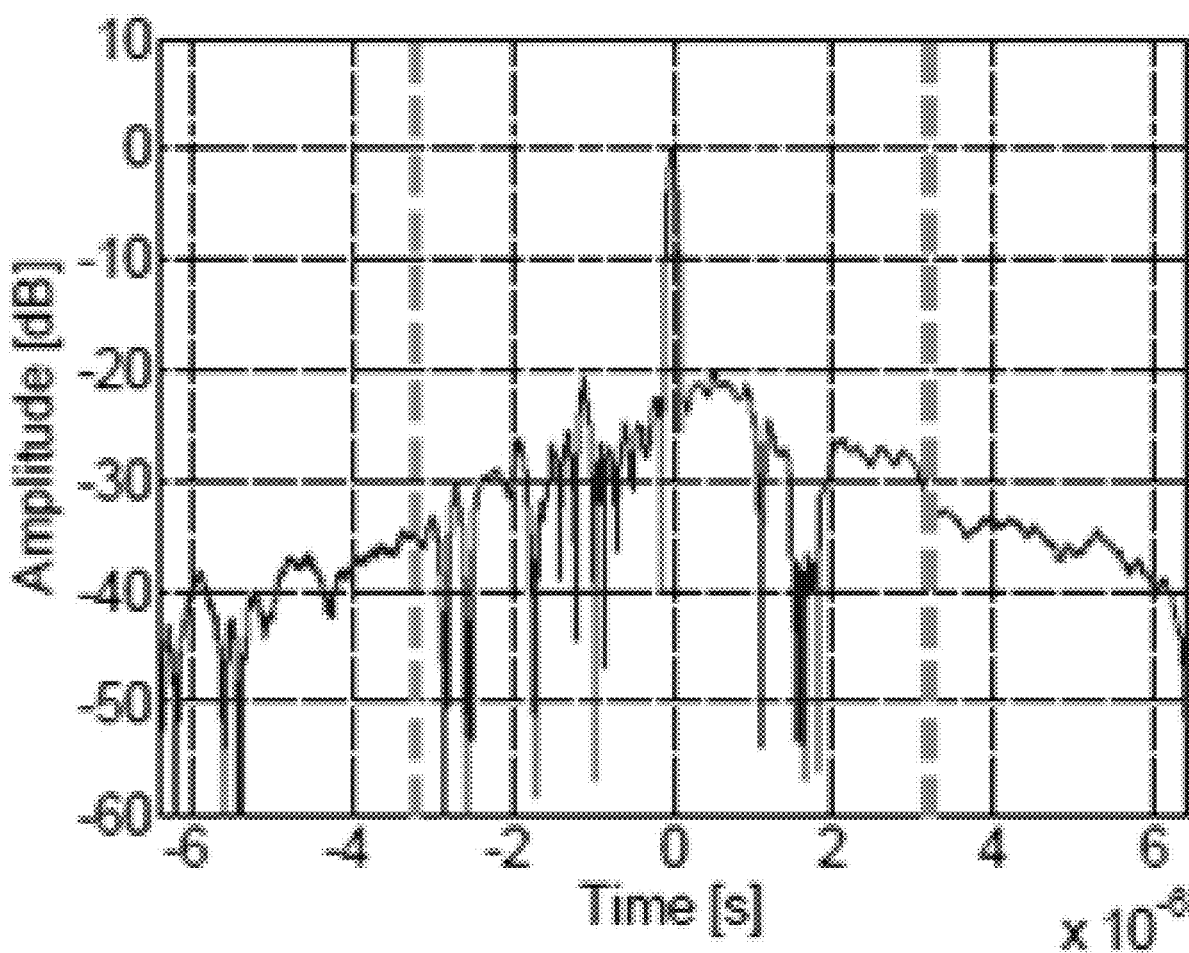
Figure 6D:
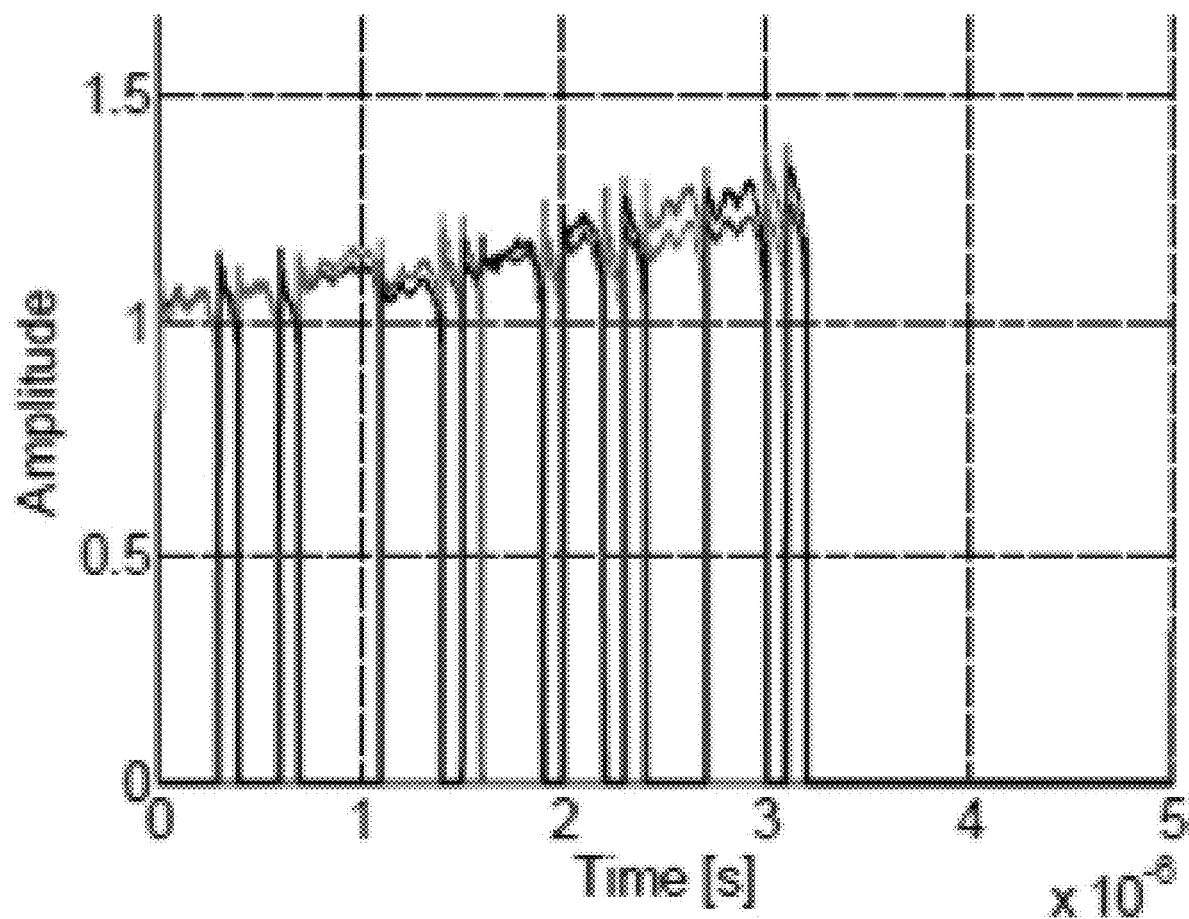
Figure 6E:
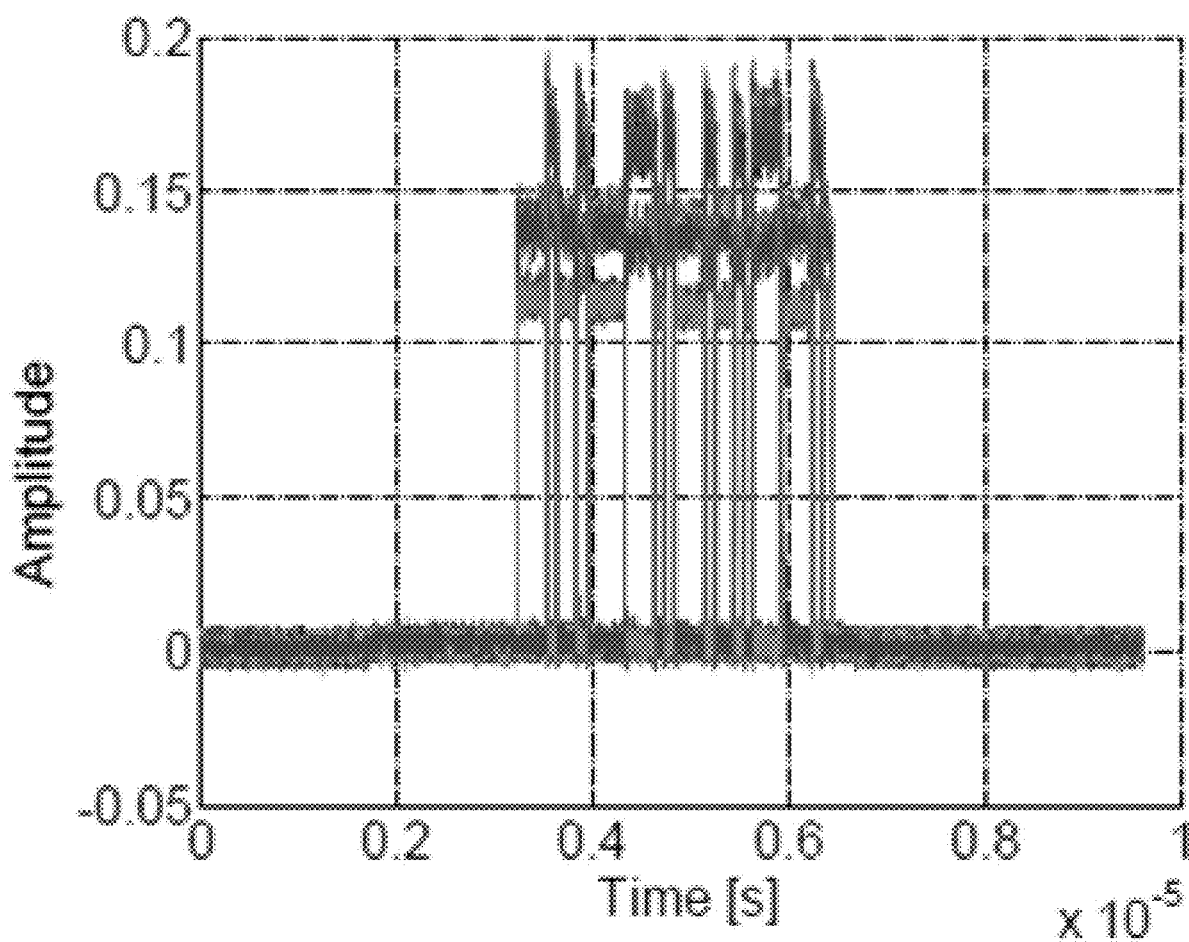
Figure 6F:
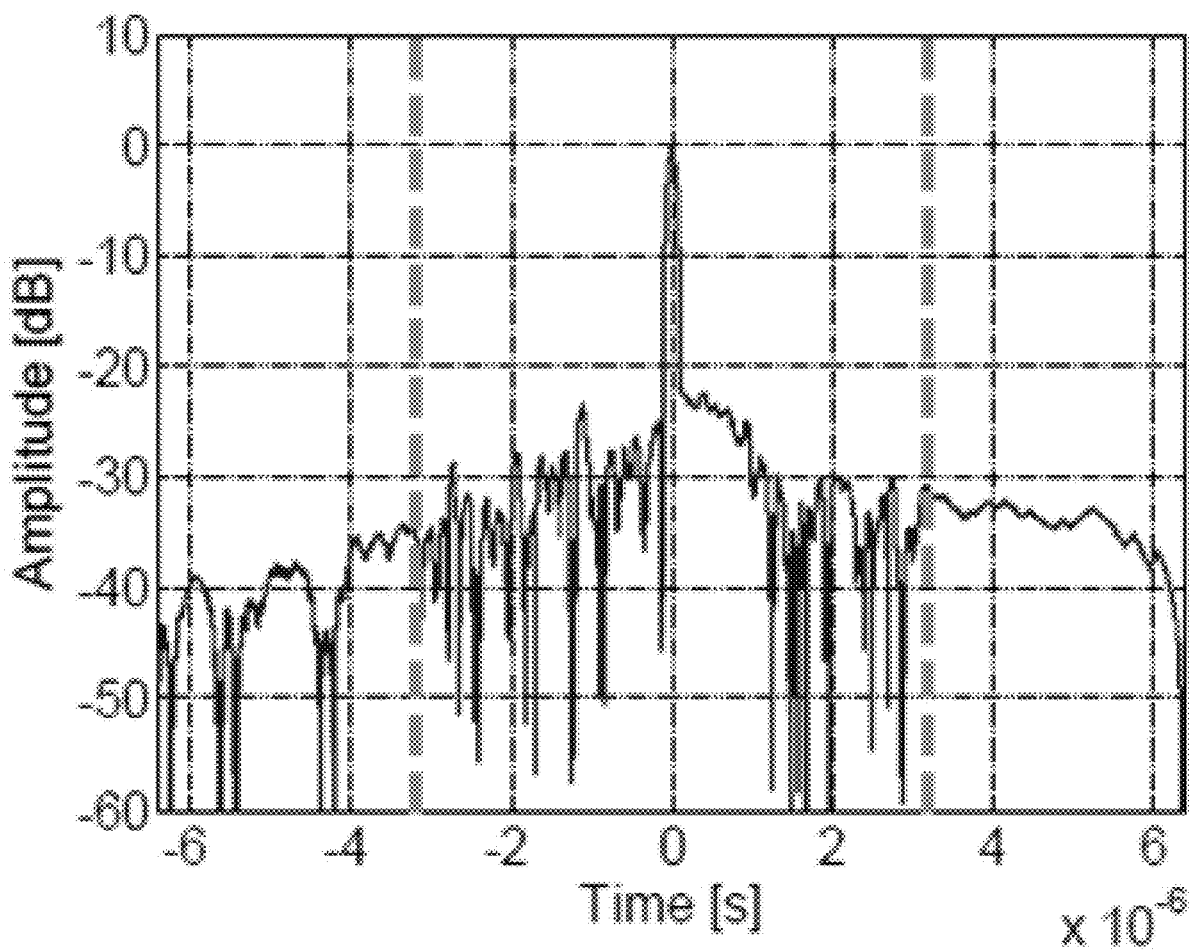
Figure 6G:
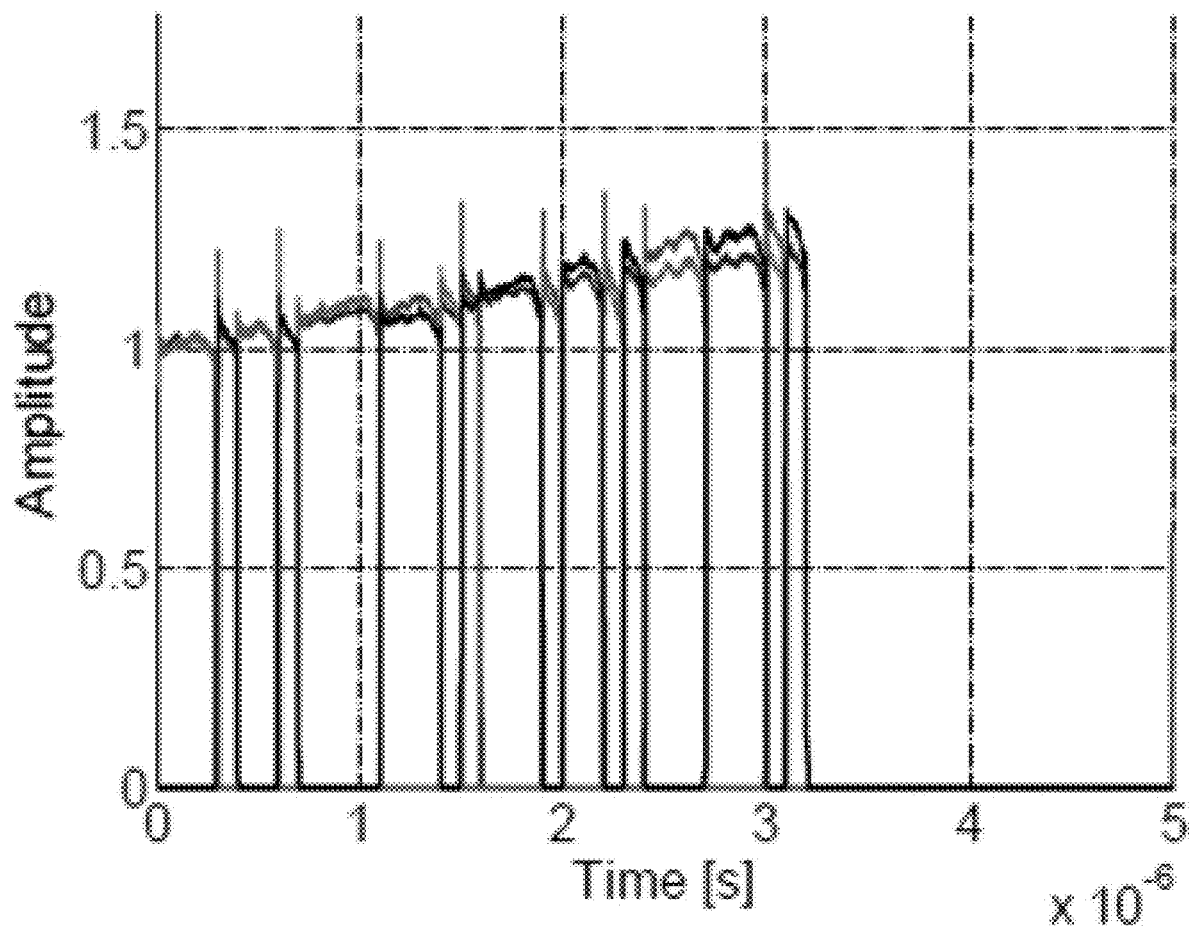
Figure 6H:
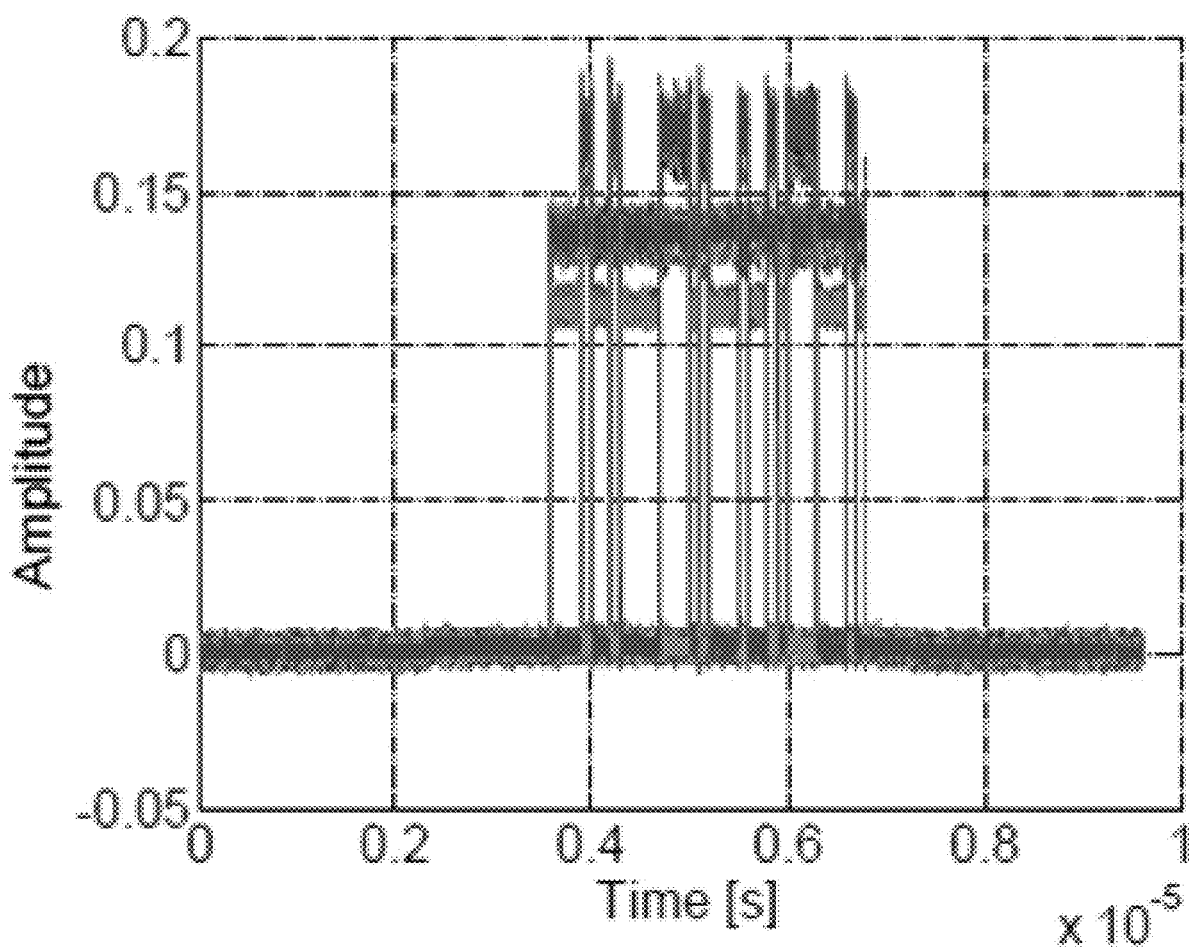
Figure 6I:
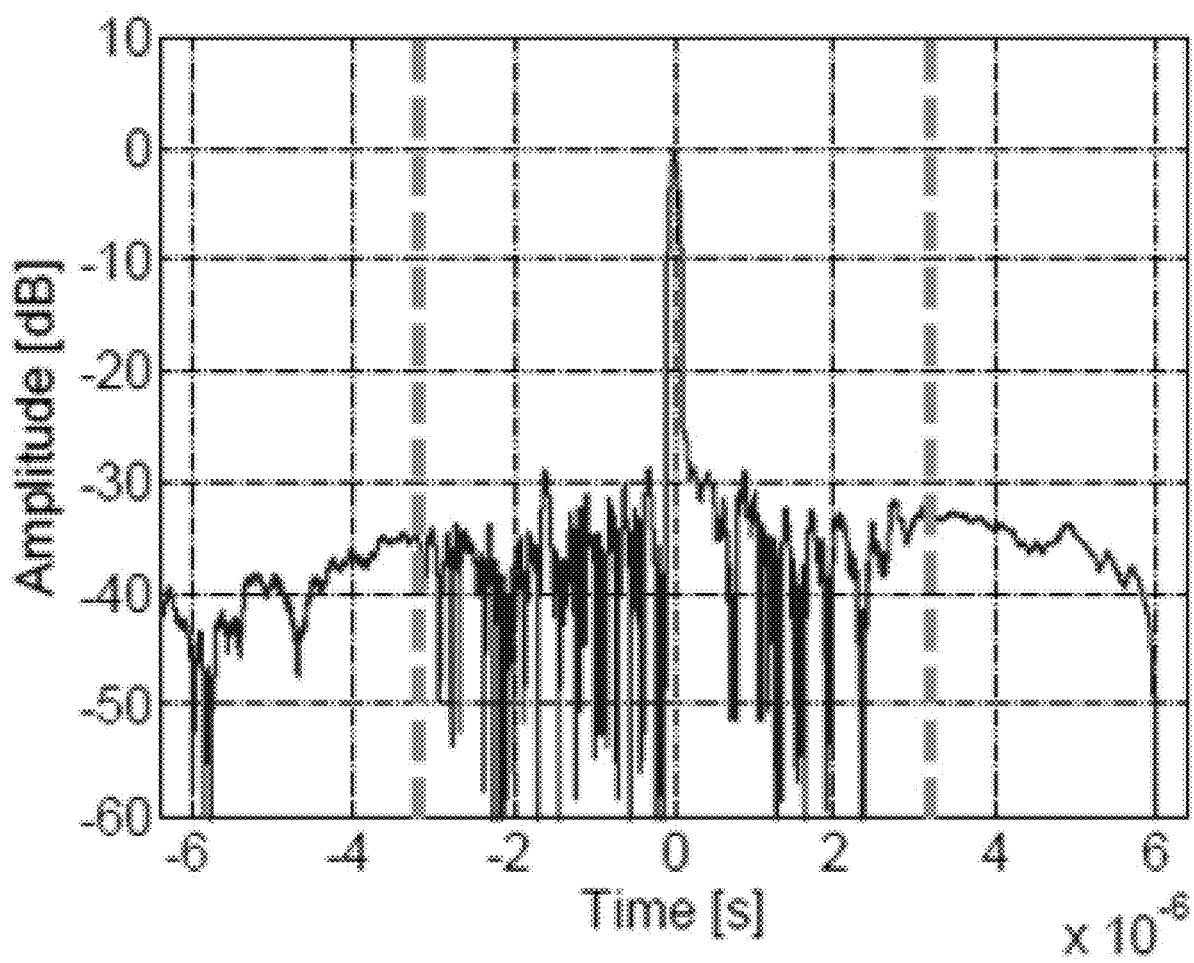

FIG. 6(A), FIG. 6(B), FIG. 6(C), FIG. 6(D), FIG. 6(E), FIG. 6(F), FIG. 6(G), FIG. 6(H), and FIG. 6(I), show a series of plots illustrating experimental results for gain dynamics mitigation using feedback and adaptive control wherein the signal is passed through a cascade of EDFA and Raman amplifiers in which for a first iteration FIG. 6(A), an initial tilt of 1 dB was implemented in the AWG, resulting in the amplitude profile measured at the receiver shown by FIG. 6(B), whose autocorrelation function is shown by FIG. 6(C), the SIR is 8.6 dB; second iteration FIG. 6(D) adjustment from the first iteration is applied to the AWG, resulting in new AWG waveforms, as well as output and autocorrelations shown by FIG. 6(E) and FIG. 6(F), SIR is 11.4 dB; fifth iteration FIG. 6(G), FIG. 6(H), and FIG. 6(I), the SIR of the autocorrelation increases to 16.5 dB, according to aspects of the present disclosure.

As there are four complementary Golay codes sequences, the iterative procedure described above must be performed separately for each sequence, i.e., P(t) can take on the value of $P_0 \cdot |A_1(t)|^2$, $P_0 \cdot |A_2(t)|^2$, $P_0 \cdot |B_1(t)|^2$ or $P_0 \cdot |B_2(t)|^2$, where $P_0$ is the launch power.

For every inline amplifier placed along the FUT, an additional splitter and photodetector is necessary to allow equalization of signal amplitude on that segment. Once equalized, it is possible to obtain an accurate BGS measurement for that segment at high SIR.

System Architecture

To understand systems, methods, and structures more fully we once again turn our attention to FIG. 4, which shown as schematic of an illustrative system. At input, a laser is split into two paths. In an upper path that generates a transmitted sequence, the signal is optionally amplified and directed through an optical modulator that is electrically driven by an output of an arbitrary waveform generator (AWG). The power of the forward-propagating signal is controlled by optional amplifiers followed by a variable optical attenuator (VOA). The signal is launched into the fiber under test (FUT) via an optical isolator. When long sensing range is required, the FUT will include Raman pumps and/or remote optically pumped amplifiers (ROPAs) to boost both the power of the forward-propagating signal as well as the backward-propagating Brillouin backscatter.

Coherent detection is used to detect the Brillouin backscatter, which arrives at the receiver via the third arm of the optical isolator. The received signal passes through amplifiers and bandpass filters (BPF) centered about the Stokes or anti-Stokes wavelength (typically around ±10.9 GHz from the center frequency of the launched signal, depending on the type of fiber in the FUT); the amplifiers boosts the power to the necessary level to overcome shot-noise and thermal noise of the coherent receiver, while the BPF rejects out-of-band noise. The local oscillator (LO) is supplied by the lower path of the splitter placed after the input laser. An optional optical modulator may be used to shift the LO to the center frequency of the Stokes or anti-Stokes wavelength to reduce the sampling rate requirement on the coherent receiver. We assume a standard dual-polarization coherent receiver comprising a dual-polarization 90 degree hybrid followed by a bank of single-ended or balanced photodiodes, whose outputs are baseband electrical voltages that are sampled by analog-to-digital converters (ADC) (FIG. 5(A)). Digital signal processing (DSP) is used to estimate the Brillouin frequency shift (BFS) at each point along the FUT. The operations necessary to estimate BFS are shown in FIG. 5(B).

To compensate gain dynamics that impact the amplitude profile of the transmitted complementary Golay sequences, splitters and photodetectors are inserted at each segment of the FUT as shown in FIG. 4. The measured amplitude profile is then sent back to the interrogator (using any suitable method) and is compared with the desired amplitude profile. The ratio between them is the 'error' which is used to adjust the output of the AWG. When compensating fast gain dynamics of Raman amplifiers, both the photodetector and the AWG will need to operate at a high oversampling ratio compared with the chip rate R=1/T of the complementary Golay sequences.

While we have presented this disclosure using some specific examples, those skilled in the art will recognize that our teachings are not so limited. Accordingly, this disclosure should be only limited by the scope of the claims attached hereto.

The invention claimed is:

1. A distributed sensing system employing Brillouin optical time-domain reflectometry (BOTDR) that compensates for online amplifier dynamics of an optical fiber, said, said system comprising:
    a generator that produces a forward-propagating optical signal over the optical fiber; and
    a receiver that detects backward-propagating a Brillouin back-scattered optical signal; and
    a feedback control circuit that compensates for online amplifier dynamics by providing feedback to an arbitrary waveform generator;
    wherein the generator includes an input laser, an output of which is optically coupled to an optical modulator that is electrically driven by an output of the arbitrary waveform generator;
    wherein the receiver includes a coherent receiver comprising an optical hybrid followed by photodiodes whose output electrical photocurrents are sampled by analog-to-digital converter(s), the outputs of which are used to determine temperature and/or strain information along the optical fiber;
    wherein a local oscillator included in the coherent receiver is supplied by a same laser that is used to produce the forward-propagating signal; and
    the local oscillator is optically coupled to an optical modulator driven by an electrical sine wave such that its center frequency is shifted to a center frequency of the Stokes or anti-Stokes wavelength of the Brillouin backscattered signal.

2. The system of claim 1 wherein the optical fiber includes Raman amplifiers and/or remote optically pumped amplifiers.

3. The system of claim 2 wherein the amplitude of the forward-propagating signal is measured and the difference between the measured signal amplitude and desired signal amplitude is used to adjust an output waveform of the arbitrary waveform generator.

4. The system of claim 1 wherein the center frequency of the Stokes or anti-Stokes wavelength is ±10.9 GHz from the center frequency of the generated, forward-propagating optical signal.

* * * * *